(12) United States Patent
Grossier

(10) Patent No.: US 7,143,247 B1
(45) Date of Patent: Nov. 28, 2006

(54) METHOD AND APPARATUS FOR PARALLEL EXECUTION PIPELINE DATA STORAGE IN A COMPUTER MEMORY

(75) Inventor: Nicolas Grossier, St Georges-de-Commiers (FR)

(73) Assignee: STMicroelectronics S.A., Gentilly (FR)

(*) Notice: Subject to any disclaimer, the term of this patent is extended or adjusted under 35 U.S.C. 154(b) by 0 days.

(21) Appl. No.: 09/563,315

(22) Filed: May 2, 2000

(30) Foreign Application Priority Data

May 3, 1999 (EP) .................................. 99410063

(51) Int. Cl.
  *G06F 12/00* (2006.01)
(52) U.S. Cl. .................. 711/154; 711/150; 711/149; 711/169; 711/168; 710/23; 710/35; 710/215
(58) Field of Classification Search ................ 711/154, 711/152, 150, 149, 147, 148, 153, 163, 168, 711/169; 712/23, 28, 35, 215, 219, 217, 712/221, 222; 713/401, 400, 600; 710/51, 710/52, 54, 61, 40, 36, 23, 28, 35, 215, 219, 710/217, 221, 222
See application file for complete search history.

(56) References Cited

U.S. PATENT DOCUMENTS

| | | | | |
|---|---|---|---|---|
| 4,507,760 A | * | 3/1985 | Fraser | ........................ 365/221 |
| 5,499,344 A | * | 3/1996 | Elnashar et al. | ............. 710/310 |
| 5,574,935 A | * | 11/1996 | Vidwans et al. | ............... 712/23 |
| 5,623,628 A | | 4/1997 | Brayton et al. | ............. 395/468 |
| 5,745,913 A | * | 4/1998 | Pattin et al. | ................. 711/105 |
| 5,781,853 A | * | 7/1998 | Johnson | ....................... 455/351 |
| 6,240,492 B1 | * | 5/2001 | Foster et al. | ................. 711/149 |
| 6,240,508 B1 | * | 5/2001 | Brown, III et al. | ......... 712/219 |
| 6,256,342 B1 | * | 7/2001 | Schlag et al. | ................ 375/229 |
| 6,279,065 B1 | * | 8/2001 | Chin et al. | ................... 710/311 |
| 6,286,083 B1 | * | 9/2001 | Chin et al. | ................... 711/151 |
| 6,311,286 B1 | * | 10/2001 | Bertone et al. | ............. 713/600 |
| 6,321,308 B1 | * | 11/2001 | Arnon et al. | ................ 711/147 |
| 6,415,357 B1 | * | 7/2002 | Wright et al. | ................ 711/133 |
| 6,564,309 B1 | * | 5/2003 | Fuin | ............................ 711/168 |

FOREIGN PATENT DOCUMENTS

EP           0 651 331           5/1995

OTHER PUBLICATIONS

European Search Report from European Application No. 99410063.
A.R. Pleszkun et al., *Stuctured Memory Access Architecture*, Proceedings of the 1983 International Conference on Parallel Processing, Aug. 23-26, 1983, pp. 461-470 XP000212140.
Yound H.C., *Code Scheduling Methods for Some Architectural Features in Pipe*, Microprocessing and Microprogramming, NL, Elsevier Science Publishers, BV., Amsterdam, vol. 22, No. 1, pp. 39-63 XP000105778, ISSN: 0165-6074.

(Continued)

*Primary Examiner*—Kimberly McLean-Mayo
(74) *Attorney, Agent, or Firm*—Lisa K. Jorgenson; Daniel P. McLoughlin; Wolf, Greenfield & Sacks, P.C.

(57) ABSTRACT

A computer system having a plurality of parallel execution pipelines which may generate data for storing in a memory, data from the pipelines may be stored in a queue prior to accessing the memory and the system includes circuitry for reordering data from the different pipelines before inserting onto the queue.

20 Claims, 4 Drawing Sheets

OTHER PUBLICATIONS

U.S. Appl. No. 09/562,551, filed May 2, 2000, Cofler et al.
U.S. Appl. No. 09/562,542, filed May 2, 2000, Wojcieszak et al.
U.S. Appl. No. 09/562,717, filed May 2, 2000, Wojcieszak et al.
U.S. Appl. No. 09/562,718, filed May 2, 2000, Wojcieszak et al.
U.S. Appl. No. 09/563,475, filed May 2, 2000, filed Cofler et al.
U.S. Appl. No. 09/562,715, filed May 2, 2000, Wojcieszak et al.
U.S. Appl. No. 09/563,610, filed May 2, 2000, Wojcieszak et al.
U.S. Appl. No. 09/563,703, filed May 2, 2000, Uguen et al.
U.S. Appl. No. 09/563,154, filed May 2, 2000, Cofler et al.
U.S. Appl. No. 09/563,704, filed May 2, 2000, Cofler et al.
U.S. Appl. No. 09/563,468, filed May 2, 2000, Cofler et al.
U.S. Appl. No. 09/561,629, filed May 2, 2000, Grossier.
U.S. Appl. No. 09/563,473, filed May 2, 2000, Bernard.
U.S. Appl. No. 09/563,186, filed May 2, 2000, Alofs.
U.S. Appl. No. 09/563,477, filed May 2, 2000, Cousin.
U.S. Appl. No. 09/563,702, filed May 2, 2000, Cofler et al.
U.S. Appl. No. 09/563,634, filed May 2, 2000, Cofler et al.
U.S. Appl. No. 09/563,153, filed May 2, 2000, Debbagh et al.

* cited by examiner

METHOD AND APPARATUS FOR PARALLEL EXECUTION PIPELINE DATA STORAGE IN A COMPUTER MEMORY

The invention relates to apparatus and methods for storing data in a computer memory.

BACKGROUND OF THE INVENTION

Computer systems may comprise a plurality of parallel execution pipelines used to generate access addresses for load and store operations in the memory as well as data for storing in the memory. Where more than one pipeline is used to generate data values for storing in the memory instructions may pass through the pipelines at different rates so that data from the different pipelines may arrive at a memory access unit in an undesired order.

It is an object of the present invention to provide improved apparatus and methods for forming a queue of data in a desired order prior to a memory store operation.

SUMMARY OF THE INVENTION

The invention provides a computer system having a memory, a plurality of parallel execution pipelines, at least two of which are arranged to output data for storing in the memory, and a data memory controller arranged to receive data from each of said two execution pipelines and form at least one queue of data awaiting store operations in said memory, said memory controller having a first input for receiving data from one of said pipelines, a second input for receiving data from the other of said two pipelines and reordering circuitry to insert data from the first and second inputs onto said queue in an order different from the order of arrival of data from the two pipelines at said first and second inputs.

Preferably write control circuitry is provided to permit transfer of data from said first and second inputs onto said queue at clocked write cycles.

Preferably said write control circuitry permits data to be written onto said queue from each of said first and second inputs during the same write cycle.

Preferably read control circuitry is provided to permit transfer of data from said queue to said memory at clocked read cycles.

Preferably said reordering circuitry comprises delay circuitry connected to said second input and arranged to delay transfer of data from said second input to the queue if data is still awaited at the first input for earlier insertion in the queue.

Preferably each of said first and second inputs comprises a selector circuit having one selector input connected to receive data from the respective pipeline and a selector output connected to latch circuitry, the latch circuitry being connected to memory access circuitry.

Preferably said delay circuitry comprises a loop circuit operable to connect an output of the latch circuitry of the second input to a further input of the selector of the second input thereby causing one or more cycles of delay before transfer of data from the latch circuitry to the memory.

Preferably by-pass circuitry is provided for each of said first and second inputs to permit data from the first or second inputs to by-pass the queue and access the memory when the queue is empty.

Preferably an output of the selector circuit of the first input is connected to a queue by-pass circuit and the selector circuit of the second input is connected to provide a further input to the selector circuit of the first input.

Preferably said data memory controller includes at least one queue holding store addresses for use in storing data in said memory.

Preferably said memory forms a plurality of separately addressable regions including X and Y memory regions, separate queues being provided in the data memory controller for data awaiting store operations in said X and Y memory regions.

Preferably each queue is provided in a FIFO device.

Preferably said execution pipelines include at least two pipelines for executing arithmetic operations and at least two pipelines for executing memory addressing operations.

Preferably clock circuitry is provided to maintain the required order of execution of a plurality of instructions which enter said parallel pipelines in the same cycle.

The invention includes a method of operating a computer system having a memory, a plurality of parallel execution pipelines and a data memory controller, which method comprises outputting data from at least two of the pipelines for storing in the memory, receiving data from one of said pipelines at a first input of the data memory controller and receiving data from a second of said pipelines at a second input in the data memory controller, and reordering data at said first and second inputs to insert data onto said queue in an order different from the arrival of data from the pipelines at said first and second input.

Preferably data arriving at said second input is delayed before adding to said queue if data is still awaited at the first input for earlier insertion in the queue.

DESCRIPTION OF THE PREFERRED EMBODIMENT

Figure 1:
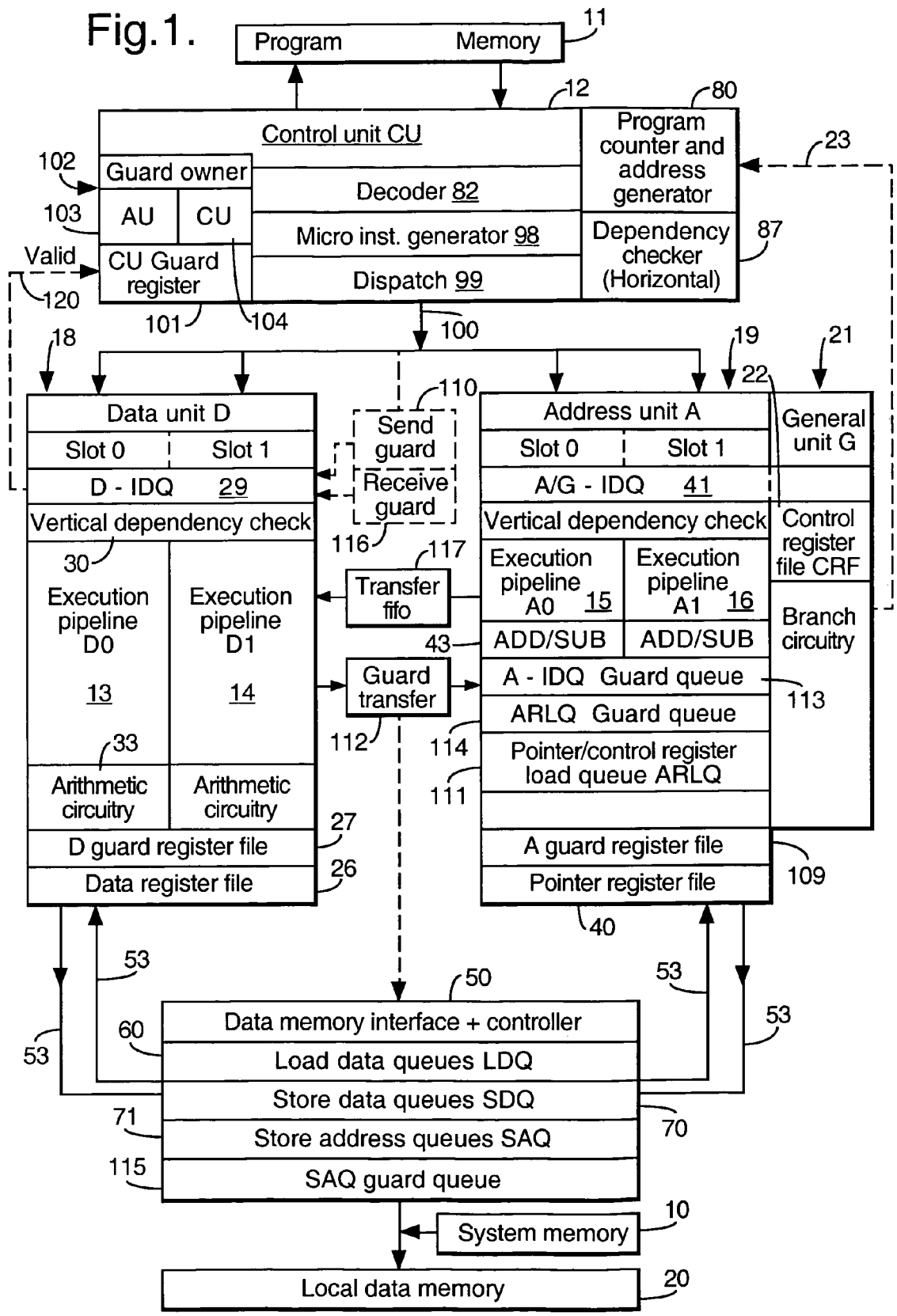
FIG. 1 shows a computer system in accordance with the present invention.

The computer system of this example is arranged for the parallel execution of a plurality of instructions and is particularly suited to providing a high digital signal processing (DSP) performance. Instructions are held in a program memory 11 and after passing through a control unit 12 are supplied to four parallel execution pipelines 13,14,15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 19 used to execute instructions for memory accesses to a data memory 20. Slot 0 or Slot 1 of the address unit 19 may also be used to supply instructions to a general unit 21 which shares some resources with the address unit 19. The general unit 21 includes a control register file 22 as well as branch circuitry which is used to provide instruction branch information on line 23 to the control unit 12.

The two pipelines 13 and 14 in the data unit 18 share a common data register file 26 and a common guard register file 27 holding the master guard values which may be associated with the instructions. The two pipelines also derive instructions from a common instruction dispatch queue (D-IDQ) 29 in the data unit 18 and instructions in the queue 29 are checked for data dependency by common vertical dependency check circuitry 30 in the data unit 18. The sequence of operations in each of the pipeline stages in the data unit 18 include an operand fetch usually accessing one of the register files 26 or 27 followed by two execution stages which use arithmetic circuitry 33 followed by a data write stage at which the result of an arithmetic operation is returned to the register file 26 and 27. A similar pipeline exists for both pipelines 13 and 14 on the data unit 18.

Similarly for the address unit 19, both pipelines 15 and 16 access a common register file 40 holding pointer values for use in load or store operations in the data memory 20. The two pipelines each take their instructions from a common instruction dispatch queue (A-IDQ) 41 and a similar vertical dependency check is provided in common for both pipelines 15 and 16 in the address unit 19. The vertical dependency check is similar to that already referred to in the data unit 18. In executing instructions through the two pipelines 15 and 16, accesses will be made to the register file 40. Add and subtract units 43 are used in execution of the instructions. Each of the pipelines 15 and 16 in the address unit 19 includes an operand fetch followed by an execution stage and an address write back stage.

Both the data unit 18 and the address unit 19 are connected to the data memory 20 through a data memory interface and controller 50. The controller 50 is connected by buses 53 to both the data unit 18 and the address unit 19. The interface and controller 50 includes a plurality of queues each connected to the buses 53. These queues include load data queues (LDQ) 60 for data which has been read from memory and is awaiting loading into register files of the data unit 18 or address unit 19. The controller 50 also includes a plurality of store data queues (SDQ) 70 for data awaiting storage in the memory. Store address queues (SAQ) 71 are provided to indicate the locations in the memory at which the data is to be written. The memory includes a local memory 20 having X and Y memory regions as well as a system memory 10.

It will be understood that when instructions are executed to load data from the data memory 20 into the data register files of the data unit 18, the address unit 19 will access the data memory 20 and load the required data into the load data queues 60 prior to completing the update of the data register file 26 by transferring the data from the appropriate queue 60. Similarly when instructions are executed to store data from the data unit 18 into the data memory 20 the appropriate data may be held in the store data queues 70 together with the store addresses in queue 71 prior to completing the store operation in the data memory 20.

By executing the memory addressing instruction in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations the memory latency can be hidden from the executing program.

In the above description, all instructions which are fed through pipelines 13, 14, 15 and 16 are subject to a vertical dependency check and if any data dependency is found which cannot be resolved by a bypass, the execution unit operates to cause a temporary stall in one of the pair of pipelines 13 or 14 or in the pair 15 and 16 so as to cause a temporary delay in one of the pipelines of the pair so as to resolve the data dependency. The operand fetch stage in each of the pipelines looks to see the first entry in the IDQ and performs the vertical dependency check between the operands of this entry and the operands that are already in the pipelines. If there is no dependency problem it performs the operand fetch and reads the micro-instructions from the IDQ. If there is a problem, it does not perform the operation fetch on that cycle so the micro-instruction stays in the IDQ and starts again on the next cycle with the same micro-instructions. The delay may be induced by the instruction dispatch queue 29 or 41 providing a signal corresponding to no operand fetch being fed to the execution pipeline for each cycle of delay that is required in order to resolve the data dependency. It will be understood that a check for a data dependency includes any form of data, including data representing guard values.

The control unit 12 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The machine may operate in a selected one of a plurality of instruction modes including superscalar modes of variable instruction bit length or in very long instruction word (VLIW) mode. The control unit 12 may include an instruction mode register to indicate the instruction mode in which the machine is operating.

In use, a plurality of instructions are obtained from the memory 11 in a single fetch operation during one cycle and are decoded by a decoder 82 in the control unit 12. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 99 through parallel paths 100 to the four slots of the parallel execution pipelines 13, 14, 15 and 16 and for the general unit 21. If a horizontal dependency was located, the microinstructions on lines 100 would include an indication to the instruction dispatch queues of the data unit 18 or address unit 19 that some action, such as a pipeline stall, was necessary in the execution pipelines to resolve the horizontal dependency.

In this example, each instruction is provided with a guard indicator G between G0 and G15 which is encoded into the instruction. If the indicator has a guard value which is true (has the value of 1), then the instruction will be executed normally (ie updates the architectural state of the machine). If the indicator has guard value which is false (has the value of 0) then normal execution of the instruction will not be completed (ie the architectural state of the machine is not changed by the instruction). Resolution of a guard value may be done in different pipeline stages of the machine.

The guard for each instruction may be selected between G0 and G15 and in this particular example the guard G15 is always true. The value true or false attributed to guards G0–G14 is however dependent upon the guard values held at any particular time in a guard register file. The master guard register file in this example is guard register file 27 in the data unit 18. However, a supplementary or shadow guard register file (normally copies of the master file 27) is provided by a control unit guard register file 101 in the control unit 12. The control unit 12 also includes a register 102 to indicate which unit is currently known to be the guard owner in respect of each guard indicator. Register 102 has a first bit 103 for each guard indicator which if holding the value 1 indicates that the address unit 19 is currently the guard holder for that indicator. If bit 104 for each guard indicator is set to the value 1 then it indicates that the control unit 12 is currently the guard owner for that guard indicator. If neither bit 103 nor 104 is set then the default condition indicates that the master guard register file 27 must be used so that the data unit 18 is the guard owner. The address unit also has a shadow guard register file 100 which may be updated by guard modifier instructions executed by the address unit 19. The guard values held in the guard register files can be changed by a guard modifier instruction (GMI) instruction executed by the data unit 18 or the address unit 19. Those executed by the data unit will update the master file 27 and the shadow file 101. Those executed by the address unit will update the shadow file 100 and the master file 27 (and hence the shadow file 101).

In normal operation the guard register file 27 in the data unit 18 maintains the architectural state of the guard values G0 to G14 and the register file is common to both execution pipelines 13 and 14. The operative values of the guards are the same for all execution pipelines although as will be explained below, the different pipelines may access different register files to obtain the guard values.

In this example the master register file for the guard values is held in the data unit 18 as it is the data unit that will most commonly execute instructions likely to change the value of the guards. Greater efficiency of execution cycles is therefore achieved by maintaining the master guard values in the register file which is directly accessed by execution of the instructions in the data unit 18. When instructions are fed through either slot 0 or slot 1 of the data unit 18 the required guard value may be taken directly from the master guard register file 27 in accordance with the guard indicator that accompanied the microinstructions fed into the data unit 18 from the control unit 12, unless the control unit 12 is the owner of the guard in which case the guard value will have been taken from the shadow registers 101 in the control unit 12.

In the case of instructions to the address unit 19, the more general position will be the default condition in the guard owner register 102 indicating that guard ownership does not belong to the address unit 19 or the control unit 12 and consequently the guard values required for execution of the instructions in the address unit 19 will need to be obtained from the guard register file 27 in the data unit 18. The microinstructions fed through lines 100 to the execution units will include supplying a "send guard" (sndG) instruction to the data unit 18 as the same time as supplying the appropriate microinstruction to the correct slot of the address unit 19. The "send guard" instruction will be slotted into the instruction dispatch queue 29 of the data unit 18 in the same cycle of operations as the microinstruction required for the address unit 19 is slotted into the instruction dispatch queue 41 for the address unit. All micro-instructions in a given execution unit are always executed in order and all guard manipulations and transfers are maintained in order with respect to these micro-instructions. This guarantees the synchronicity of guard transfers (ie for every guard emission from a given execution unit there is an opposite guard reception in another execution unit and all these are done in order. The control unit has responsibility to generate the correct micro-instructions for guard transfers; the sending or receiving execution unit only sees the send or receive (respectively) micro-instruction ie the action that it must do). In this way the correct sequencing occurs with the correct guard value being obtained from the guard register file 27 corresponding to the instruction being executed in the address unit 19. The supply of the "send guard" instruction in such a situation is illustrated at 110 in the drawing. The address unit 19 has a queue of instructions 41 awaiting dispatch to the execution units. It also has a queue 111 (ARLQ) of items awaiting loading into the pointer or control registers 40 or 22. There are also queues 71 in the memory interface control 50 of store addresses queues awaiting a memory access as a result of partial execution of a store instruction in the address unit 19. When the address unit 19 awaits a guard transfer from the data unit 18, the instruction in the address unit 19 is stalled in the A-IDQ 41 or in the ARLQ 111 or in a store address queue 71 until the requested guard value is transmitted from the data unit 18 through guard transfer circuitry 112 to the required destination. The transfer of the correct guard value will occur when the data unit 18 executes in its pipeline operation the "send guard" instruction and the guard value which is transferred to either the address unit 19 or the data memory controller 50 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111 then the transferred guard value will be held in an ARLQ guard queue 114. In the case of a store instruction where the store address had been added to a SAQ 71 in the memory controller 50, the guard value will be transferred from circuitry 112 to an SAQ guard queue 115 in the data memory controller 50 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 50 prior to checking whether or not the guard value of the store instruction is true or false. The store operation will be held in a queue 71 until the guard value is checked and will only proceed to completion if the guard value is true. In each case where the guard value is transferred to the address unit 19 from the data unit 18, the stalled instruction for the address unit or general unit 21 will be resumed or rendered inoperative depending on the guard value transferred from the data unit file 27.

The use of the guard queues 113, 114 and 115 allow resynchronisation of the guard values with the microinstruction that caused the request "send guard" 110 to be sent to the data unit 18. The above description for operation of a guarded store instruction indicated how the effective store address could be put on a queue 71 prior to resolving the guard value. The address unit 19 may be operated with an earlier stall in the execution of a store instruction so that the effective address is not calculated and fed to the memory controller 50 until after the guard value has been transferred and resolved. Similarly a guarded load instruction may be executed by the address unit 19 to access the memory and obtain the required data for addition to a load data queue 60 prior to resolving the guard value. Alternatively the address unit may cause an earlier stall awaiting resolution of the guard value transferred from the data unit prior to obtaining the data from the memory and putting it into the queue 60. In the case where the data is obtained from the memory and put onto a load data queue 60 prior to resolution of the guard value, the appropriate register file 26, 40 or 22 is updated by a load operation from the load data queue 60 only if the guard value is found to be true. In the case of a false guard value, the register files are not updated and the appropriate execution unit effects a read of the load data queue 60 to remove the unwanted data from the queue without updating any destination register file.

Transfers of data between the data unit 18, address unit 19 and the data memory interface and controller 50 are carried out in accordance with Request/Grant protocol. In this way transfers of data occur only at controlled times which permit maintenance of the correct order of each operation. It will be understood that with parallel execution of instructions in slot 0 and slot 1 of the data unit as well as instructions in slot 0 and slot 1 of the address unit, it is necessary to maintain the correct ordering between slot 0 and slot 1. By use of the Request/Grant protocol, the memory controller will be aware of the required order between slot 0 and slot 1 through the operation of the Request/Grant protocol used by the address unit in providing the store or load address to the controller 50. However, in the case of store operations it is possible that data from the data unit may arrive at the controller 50 with the incorrect order between slot 0 and slot 1. In which case some reordering of the data onto a store data queue (SDQ) may be needed.

All load operations issued by the address unit are carried out in strict order and similarly all store operations issued by the address unit are carried out in strict order. It is however possible for load operations to by-pass and overtake store operations provided there is no conflict on the memory address that is to be used for the two operations. If there is any conflict then a store operation preceding a load must be carried out before the load can be effected.

Figure 2:
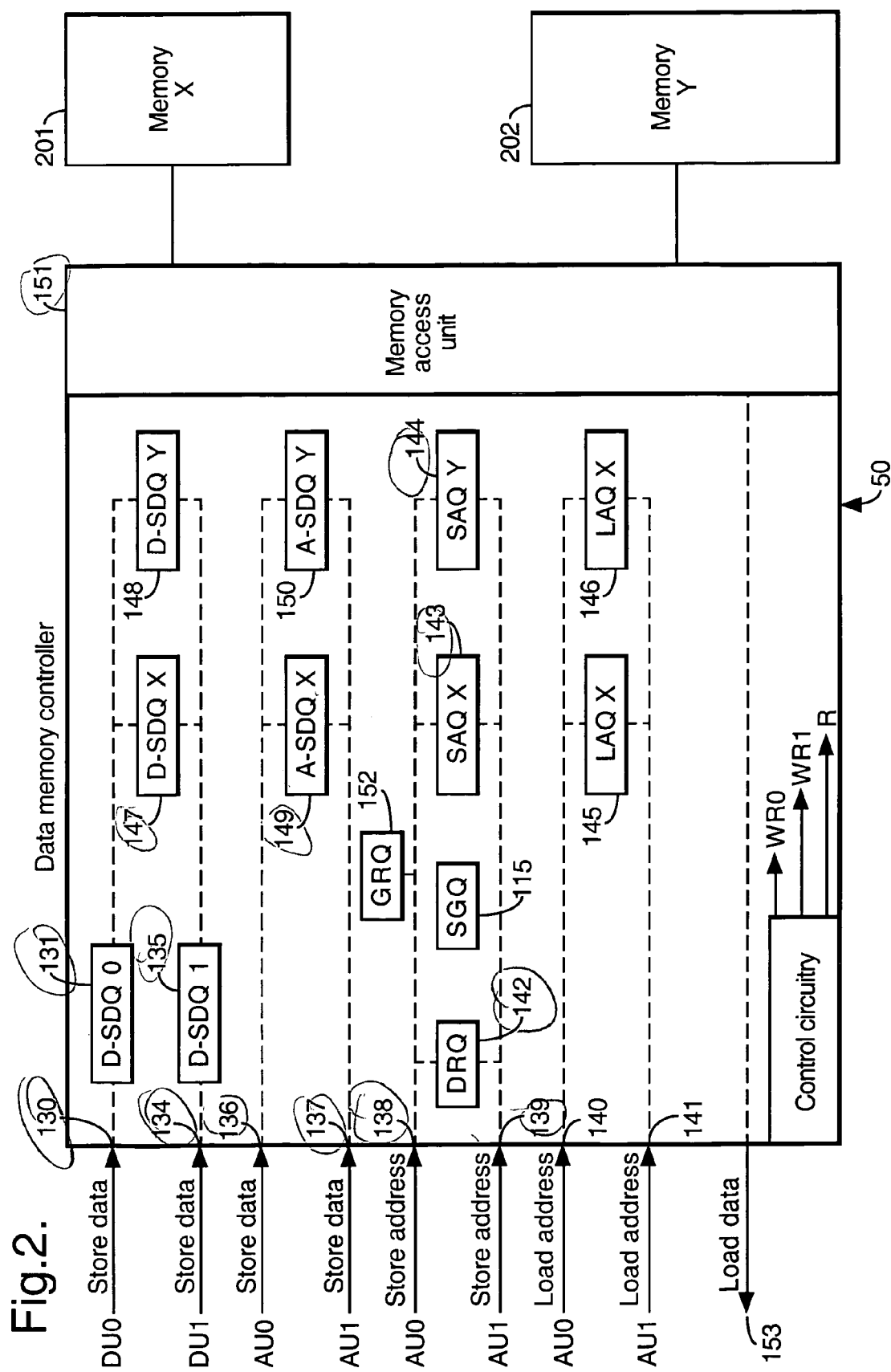
FIG. 2 illustrated in more detail a plurality of queues formed in a data memory controller forming part of the apparatus of FIG. 1.

FIG. 2 illustrates in more detail the queues that are held in the memory controller 50 together with the inputs which arrive from the data unit 18 and address unit 19. Input 130 provides a store data input from slot 0 of the data unit 18 and data is initially held on a queue 131 until information is available to clarify whether the data is to be written into the X memory 201 or the Y memory 202. Queue 131 is formed by a FIFO. All other queues in the controller 50 are similarly formed by a FIFO. A further input 134 receives data from slot 1 of data unit 18 and is held on a queue 135 similar to queue 131 until information is available to determine whether the data is to be written into the X or the Y memory. The operation of that will be described in more detail with reference to FIG. 3.

A further input 136 receives data to be stored in the memory which has been supplied by slot 0 of the address unit 19. Input 137 similarly receives data to be stored which has been supplied by slot 1 of the address unit 19. The store addresses are input at 138 and 139 respectively from slot 0 and slot 1 of the address unit 19. Load addresses from slot 0 and slot 1 of the address unit 19 are input at 140 and 141 respectively. The store addresses which are input from the address unit also form the queue in a Data Routing queue 142. Data which is input from the data unit giving guard values necessary for store or load instructions is put on a queue 115 for guard values. A guard routing queue 152 is also formed for the addresses for guard values.

The addresses which are supplied from the address unit 19 will indicate both for store and load operations whether the memory to be accessed is the X or Y memory and consequently the store address details from inputs 138 and 139 are separated into a queue 143 for store addresses in the X memory and a further queue 144 for store addresses in the Y memory. Similarly the load addresses which are input at 140 and 141 are separated into a first load address queue 145 for the X memory and a further load address queue 146 for the Y memory. The data which is to be stored in the memory is put onto one of four possible queues. Queue 147 holds data from the data unit which is to be stored in the X memory. Queue 148 holds data from the data unit which is to be stored in the Y memory. Queue 149 holds data from the address unit which is to be stored in the X memory and queue 150 holds data from the address unit which is to be stored in the Y memory. A memory access unit 151 controls transfer of data to or from the queues in the controller to or from the memories 201 or 202.

In the case of load operations data is read from the memory through the access unit 151 and forms an output 153 which transfers the data to a load data queue 60 as described with reference to FIG. 1.

Figure 3:
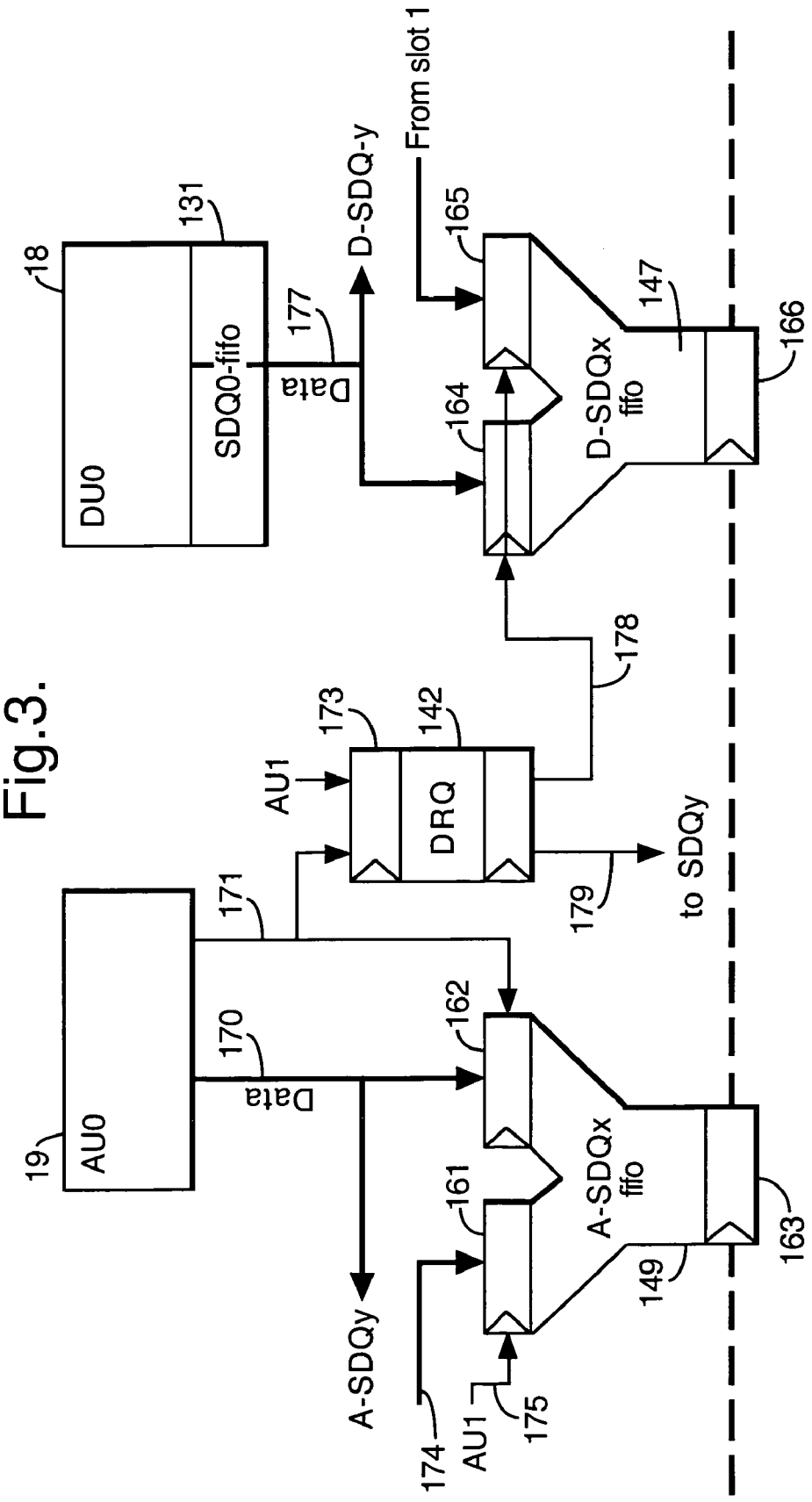
FIG. 3 shows in more detail part of the apparatus of FIG. 2.

A more detailed description of the way in which data is received from slot 0 of the address unit 19 and slot 0 of the address unit 18 will now be described with reference to FIG. 3. Each of the queues including queues 147 and 149, is of similar construction and consists of a FIFO with two input ports and one output port. Each FIFO has rolling read and write pointers. In the case of queue 149 the two input ports are formed respectively by clocked flip-flops 161 and 162. The output port is formed by a similar clocked flip-flop 163. In the case of the data queue 147, the two input ports are formed by clocked flip-flops 164 and 165 whereas the output port is formed by the clocked flip-flop 166. Each of the queues 149 and 147 acts as a dual write port in that two write operations may occur in one write cycle. When data arrives at both the input ports simultaneously the write mechanism of the FIFO enables data from both input ports to be written onto the queue in the same write cycle with the data from slot 0 being entered in the queue before that of slot 1. Only one data item may be read out of the FIFO during any read cycle. The data routing queue 142 is a single input and single output port FIFO with the input and output port each having a latched flip-flop. When data is output from slot 0 of the address unit 19, the data is output on line 170 and address information is provided on line 171 to indicate whether the address is in the X or Y memory. The address information on line 171 controls access to queue 149 through the first input port 162. The second input port 161 of the FIFO 149 is arranged to receive data on line 174 from slot 1 of the address unit 19. Similarly the second input port 161 receives address information on line 175 from slot 1 of the address unit to indicate whether an input should be made through input port 161 of the X memory queue 149. The signals on lines 175 and 171 identifying whether the data is addressed to the X or Y memory will control the inputs ports so that data may be put onto the queue 149 from either slot b or slot 1 of the address unit. In the case of the data unit, data is initially put onto the queue 131 prior to an indication of whether the data is to be received by the X or Y memory. Queue 131 is again a FIFO which has an output on line 177 directed to input 164 of the queue 147 and also to the data queue 148 for the Y memory. The second input 165 of queue 147 receives data from queue 135 of slot 1 of the data unit 18. Access through the input ports 164 and 165 of queue 147 is controlled by a signal on line 178 from the output of the Data Routing queue 142. The Data Routing queue 142 also provides an output 179 to control inputs to the store data queue 148 for the Y memory. It will be appreciated that data can only be entered on queue 147 when the Data Routing queue 142 has received the appropriate indication from the address unit as to whether the data from the data unit is to be put onto a queue for the X memory or the Y memory. Again data can be put onto queue 147 from both inputs 164 and 165 during a single write cycle if data has arrived from both slot 0 and slot 1 and in that event the data from slot 0 will be put on the queue in front of data from slot 1.

Figure 4:
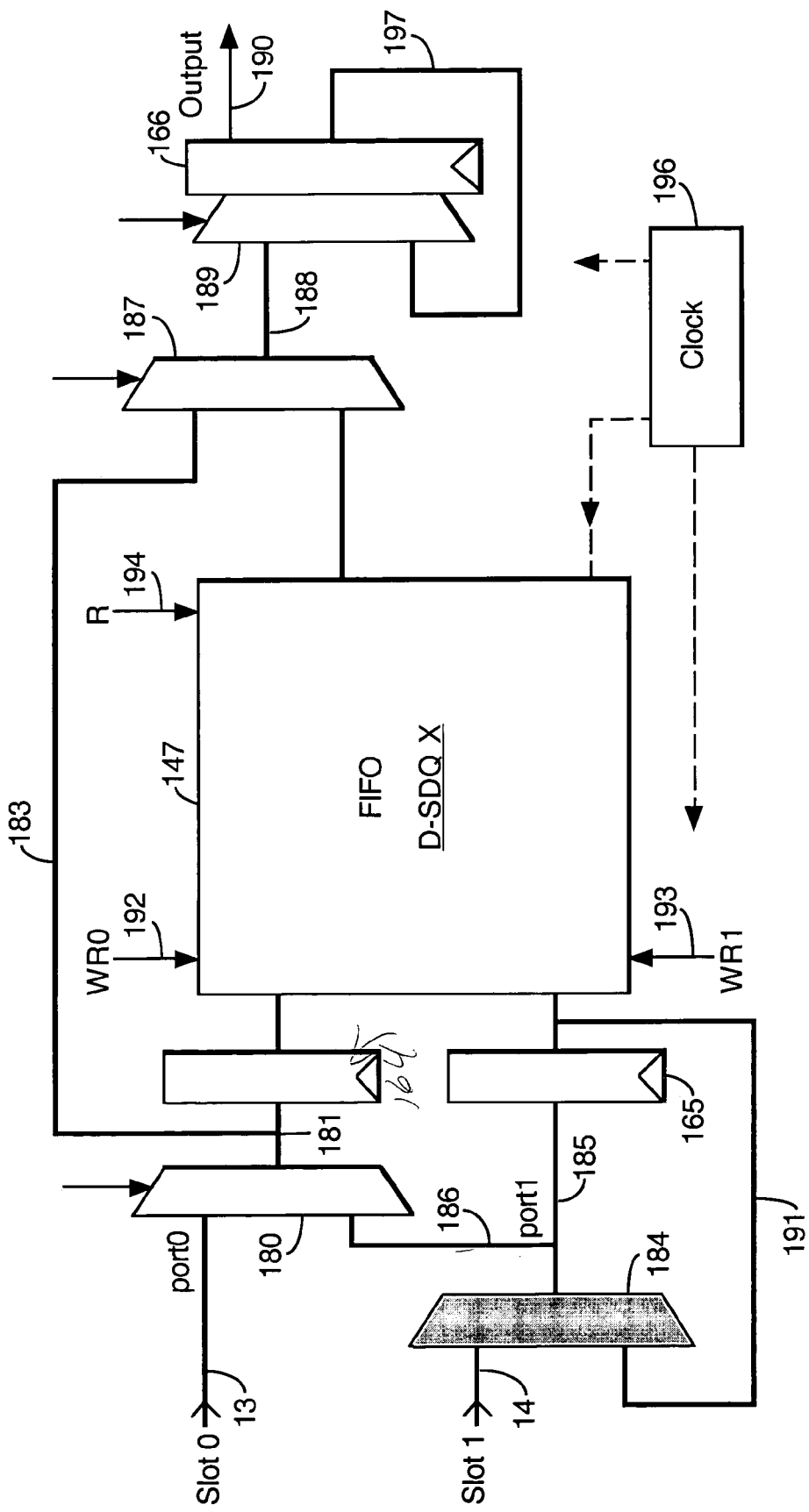
FIG. 4 shows further detail of part of the circuitry of FIG. 3.

More details of the store data queue 147 for the X memory is shown in FIG. 4. As already explained, this queue 147 receiving data from the date unit 18 may receive data from both slot 0 which is marked 13 corresponding to pipeline 13 or from slot 1 which is marked 14 corresponding to pipeline 14. Data arriving at the input 13 is applied to one input of a multiplexer 180 which provides an output 181 connected to the flip-flop 164 and to a by-pass circuit 183. Similarly data arriving from slot 1 on line 14 is supplied to a further multiplexer 184 which provides an output on line 185 to the clocked flip-flop 165. The output 185 is also fed on a line 186 to a second input of the multiplexer 180 so that when there is no data in slot 0, slot 1 can be selected by the multiplexer 180 and fed to the queue 147 as if it was a slot 0 input. The by-pass circuit 183 enables either slot 0 or slot 1 inputs to go directly to the output multiplexer 187 when queue 147 is empty thereby avoiding the delay of being put on the queue 147 and later removed. The by-pass circuit 183 forms one input of the output multiplexer 187. The output 188 of the multiplexer 187 forms one input to a further multiplexer 189 connected to the output clocked flip-flop 166. Flip-flop 166 provides an output on line 190 which leads directly to the memory access unit 151 of FIG. 2. If there is data in the memory 147 so that the by-pass 183 is not operated, data may arrive on either slot 0 input 13 or slot 1 input 14, or possibly on both, during any write cycle. If data arrives from slot 0 on input 13 before data on slot 1, then multiplexer 180 may transmit the data to the flip-flop 164 and then into the queue 147. If data arrives simultaneously on slot 0 and slot then data from slot 1 may be passed through the multiplexer 18 onto the flip-flop 165 so that data is written from both flip-flops 164 and 165 in the same write cycle. The data from slot 0 will be entered on the queue ahead of that from slot 1 so that the write pointer in the FIFO 147 will move two positions in one write cycle. It is however necessary to maintain the correct order between slot 0 and slot 1 in the case of instructions which entered slot 0 and slot 1 of the data unit at the same time. It is possible that due to the cycles of execution needed in the pipelines of the data unit, data may become available on slot 1 before the corresponding data becomes available on slot 0. In this case data may arrive at slot 1 connected to the multiplexer 184 before data has arrived at multiplexer 180. As shown in FIG. 4 a delay circuit 191 is connected between the output of the flip-flop 165 and a second input of the multiplexer 184. In the event that data arrives on slot 1 and not on slot 0 when the data memory controller is awaiting data on both slots, then some reordering must occur in order to delay entry of the data from slot 1 onto the queue. The data is passed through the multiplexer 184 and the flip 165 but the control logic of the FIFO 147 does not enable the data to be written into the FIFO. The data is recirculated to the input of the multiplexer 184 and this may occur for as many cycles as necessary until data has been latched onto the flip-flops 164 and 165 as a result of data arriving from both slot 0 as well as slot 1. At that time the data may be written into the queue 147 from both input ports. The writing of data onto the queue from the flip-flops 164 and 165 is controlled by write enable signals 192 and 193 for slots 0 and 1 respectively. Similarly data is written out of the queue by a read enable signal 194, the write enable and read enable signals being generated within the control logic of the FIFO 147. The operation of the flip-flops 164, 165 and 166 are controlled by signals from a clock 196. The output from flip-flop 166 may also be delayed by one or more cycles by a recycle circuit 197 arranged to connect the output of the flip-flop 166 to a second input of the multiplexer 189.

By use of the above circuitry, the address unit 19 and data unit 18 may operate with decoupled access to the memory and the pipelines of slot 0 and slot 1 may operate in a way which minimises delay within the pipelined execution. However the correct order of data being provided to the X and Y memories is maintained by the queues in the data memory controller and the circuitry to enable reordering of data prior to entry onto the queues if the data arrives on one slot prior to the arrival of data which is to precede it on another slot.

Although the above example shows a data reordering mechanism for the store data queue 147, a similar reordering mechanism is provided for data arriving for the other store data queue 148. Outputs from slot 0 and slot 1 of the Address Unit 19 are maintained in strict order so that re-ordering is not needed. The guard value queues do not require large storage capacity as do the data queues and so separate queues of guard values for slot 0 and slot 1 are maintained.

The invention is not limited to the details of the foregoing example.

The invention claimed is:

1. A computer system having a memory, a data unit comprising a first parallel execution pipeline in a first slot of the data unit and a second parallel execution pipeline in a second slot of the data unit, said pipelines being arranged to output data for storing in said memory, and at least one other execution pipeline being arranged to output access addresses for the data, and a data memory controller arranged to receive data from each of said at least two parallel execution pipelines and form at least one data queue of data awaiting store operations in said memory, said data memory controller having a first input for receiving data from the first parallel execution pipeline, a second input for receiving data from the second parallel execution pipeline, reordering circuitry to enable reordering of data prior to entry on said at least one data queue and to insert data from said first and second inputs onto said at least one data queue in an order different from the order of arrival of data from said parallel execution pipelines at said first and second inputs such that data from the first slot is inserted onto the queue before data from the second slot and at least one address queue, separate from said at least one data queue, holding store addresses for use in storing data in said memory.

2. A computer system according to claim 1 in which write control circuitry is provided to permit transfer of data from said first and second inputs onto said at least one data queue at clocked write cycles.

3. A computer system according to claim 2 in which said write control circuitry permits data to be written onto said at least one data queue from each of said first and second inputs during a same write cycle.

4. A computer system according to claim 1 in which read control circuitry is provided to permit transfer of data from said at least one data queue to said memory at clocked read cycles.

5. A computer system according to claim 1 in which said reordering circuitry comprises delay circuitry connected to said second input and arranged to delay transfer of data from said second input to said at least one data queue if data is still awaited at said first input for earlier insertion in said at least one data queue.

6. A computer system according to claim 5 in which each of said first and second inputs comprises a selector circuit having one selector input connected to receive data from a respective parallel execution pipeline and a selector output connected to latch circuitry, the latch circuitry being connected to memory access circuitry.

7. A computer system according to claim 6 in which said delay circuitry comprises a loop circuit operable to connect an output of the latch circuitry of said second input to a further input of the selector circuit of said second input thereby causing one or more cycles of delay before transfer of data from the latch circuitry to said memory.

8. A computer system according to claim 7 in which by-pass circuitry is provided for each of said first and second inputs to permit data from said first or second inputs to by-pass said at least one data queue and access said memory when said at least one queue is empty.

9. A computer system according to claim 8 in which an output of the selector circuit of said first input is connected to a by-pass circuit and the selector circuit of said second input is connected to provide a further input to the selector circuit of said first input.

10. A computer system according to claim 1 in which said memory forms a plurality of separately addressable regions including X and Y memory regions, separate queues being provided in said data memory controller for data awaiting store operations in said X and Y memory regions.

11. A computer system according to claim 1 in which said at least one data queue is provided in a FIFO device.

12. A computer system according to claim 1 in which said plurality of parallel execution pipelines include at least two parallel execution pipelines for executing arithmetic operations and at least two parallel execution pipelines for executing memory addressing operations.

13. A computer system according to claim 1 in which clock circuitry is provided to maintain a required order of execution of a plurality of instructions which enter said at least two parallel execution pipelines in a same cycle.

14. A method of operating a computer system having a memory, and a data memory controller and a data unit comprising a first parallel execution pipeline in a first slot of the data unit and a second parallel execution pipeline in a second slot of the data unit, wherein the method comprises outputting data from the first and second parallel execution pipelines for storing in the memory and outputting access addresses onto an address queue from at least one other execution pipeline arranged to output access addresses for the data, receiving data from the first parallel execution pipeline at a first input of the data memory controller and receiving data from the second of said at least two parallel execution pipeline at a second input in the data memory controller, and reordering data at said first and second inputs prior to entry on a data queue to insert data onto said data queue in an order different from an arrival of data from said at least two parallel execution pipelines at said first and second inputs such that data from the first slot is inserted onto the data queue before data from the second slot.

15. A method according to claim 14 in which data arriving at said second input is delayed before adding to said data queue if data is still awaited at said first input for earlier insertion in said data queue.

16. A computer system comprising:
a memory;
a data unit comprising a first parallel execution pipeline in a first slot of the data unit and a second parallel execution pipeline in a second slot of the data unit, said pipelines being arranged to output data for storing in said memory;
at least one other execution pipeline being arranged to output access addresses for the data; and
a data memory controller arranged to receive data from each of said at least two parallel execution pipelines and from at least one data queue of data awaiting store operations in said memory, said data memory controller comprising:
a first input for receiving data from the first parallel execution pipeline;
a second input for receiving data from the second parallel execution pipeline;
reordering circuitry to enable reordering of data prior to entry on said at least one data queue and to insert data from said first and second inputs onto said at least one data queue in an order different from the order of arrival of data from said parallel execution pipelines at said first and second inputs such that data from the first slot is inserted onto the queue before data from the second slot; and
at least one address queue, separate from said at least one data queue, holding store addresses for use in storing data in said memory,
wherein the reordering circuitry comprises delay circuitry connected to said second input and arranged to delay transfer of data from said second input to said at least one data queue if data is still awaited at said first input for earlier insertion in said at least one data queue.

17. A computer system according to claim 16 in which each of said first and second inputs comprises a selector circuit having one selector input connected to receive data from a respective parallel execution pipeline and a selector output connected to latch circuitry, the latch circuitry being connected to memory access circuitry.

18. A computer system according to claim 17 in which said delay circuitry comprises a loop circuit operable to connect an output of the latch circuitry of said second input to a further input of the selector circuit of said second input thereby causing one or more cycles of delay before transfer of data from the latch circuitry to said memory.

19. A computer system according to claim 18 in which by-pass circuitry is provided for each of said first and second inputs to permit data from said first or second inputs to by-pass said at least one data queue and access said memory when said at least one queue is empty.

20. A computer system according to claim 19 in which an output of the selector circuit of said first input is connected to a by-pass circuit and the selector circuit of said second input is connected to provide a further input to the selector circuit of said first input.

* * * * *